(12) United States Patent
Bassi et al.

(10) Patent No.: US 9,034,412 B2
(45) Date of Patent: May 19, 2015

(54) WHEAT PROTEIN AND METHODS OF PRODUCTION

(75) Inventors: Neal D. Bassi, Overland Park, KS (US); Leonidas R Bell, Dollard-des Ormeaux (CA); Brook A. Carson, Kansas City, MO (US); Normand Germain, Vaudreuil-Dorion (CA); Michel Giroux, Repentigny (CA)

(73) Assignee: Archer-Daniels-Midland Company, Decatur, IL (US)

(*) Notice: Subject to any disclaimer, the term of this patent is extended or adjusted under 35 U.S.C. 154(b) by 809 days.

(21) Appl. No.: 12/082,441

(22) Filed: Apr. 11, 2008

(65) Prior Publication Data

US 2008/0254200 A1  Oct. 16, 2008

Related U.S. Application Data

(60) Provisional application No. 60/911,617, filed on Apr. 13, 2007.

(51) Int. Cl.
*A23J 1/00* (2006.01)
*A23J 3/18* (2006.01)

(52) U.S. Cl.
CPC ............... *A23J 3/18* (2013.01); *A23V 2002/00* (2013.01)

(58) Field of Classification Search
None
See application file for complete search history.

(56) References Cited

U.S. PATENT DOCUMENTS

| | | |
|---|---|---|
| 2,863,771 A | 12/1958 | Ferrara |
| 5,945,299 A | 8/1999 | Von Kries et al. |
| 6,113,975 A | 9/2000 | Grace et al. |
| 2003/0134023 A1 | 7/2003 | Anfinsen |
| 2005/0037125 A1 | 2/2005 | Maningat et al. |
| 2005/0287267 A1 | 12/2005 | Maningat et al. |
| 2007/0014914 A1 | 1/2007 | Borders et al. |
| 2007/0077345 A1 | 4/2007 | Borders et al. |

FOREIGN PATENT DOCUMENTS

| | | |
|---|---|---|
| EP | 0 824 870 | 2/1998 |
| GB | 708806 | 5/1954 |
| GB | 2 033 205 | 5/1980 |
| WO | WO 82/03749 | 11/1982 |
| WO | WO 97/01965 | 1/1997 |
| WO | WO 2005/110117 A1 | 11/2005 |
| WO | WO 2006/011911 A1 | 2/2006 |
| WO | WO 2006/119206 A2 | 11/2006 |
| WO | WO 2006/123932 A2 | 11/2006 |
| WO | WO 2006/138039 A2 | 12/2006 |
| WO | WO 2007/006431 A1 | 1/2007 |

OTHER PUBLICATIONS

Smith et al, Food Additives Data Book, Table 1—Acidulants, Blackwell Publishing, 2003.*
Manildra Group, "GRAS Determination—Isolated Wheat Protein, Notice of a Claim for GRAS Exemption Based on a GRAS Determination," 1999, p. 1-34.*

(Continued)

*Primary Examiner* — Elizabeth Gwartney
(74) *Attorney, Agent, or Firm* — Andrew F. Nilles

(57) ABSTRACT

Isolated wheat proteins that are substantially free of sulfites and compositions formed from the isolated wheat proteins are described. Methods of forming compositions which include isolated wheat proteins that are substantially free of sulfites are also described.

19 Claims, 4 Drawing Sheets

(56) References Cited

OTHER PUBLICATIONS

U.S. Appl. No. 12/011,067, filed Jan. 24, 2008, Ledbetter et al.
Product Specification Sheet, Prolite™ Functional Wheat Proteins, Archer-Daniels-Midland Company, Prolite™ Functional Wheat Proteins PDF available at http://www.admworld.com/naen/mktcol/food.asp (last visited Apr. 11, 2008).
Product Specification Sheet, Wheat Pron™ 75, Archer-Daniels-Midland Company, available at http://www.admworld.com/naen/productdb/details.asbx?productID=231 (last visited Apr. 11, 2008).
"Sulfites in Foods," Optimized Monier-Williams Method, AOAC Official Method 990.28, AOAC Official Methods of Analysis (1995), chapter 47, pp. 29-31.

Notification of Transmittal of the International Search Report and Written Opinion of the International Searching Authority and International Search Report. European Patent Office acting as the International Searching Authority for International Application No. PCT/US2008/004725, mailed Nov. 13, 2008.
Bleukx et al., On the Presence and Activities of Proteolytic Enzymes in Vital Wheat Gluten, Journal of Cereal Science 26 (1997) 183-193, Academic Press Limited.
Kong et al., Enzymatic hydrolysis of wheat gluten by proteases and properties of the resulting hydrolysates, ScienceDirect, Food Chemistry 102 (2007) 759-763.

* cited by examiner

WHEAT PROTEIN AND METHODS OF PRODUCTION

CROSS REFERENCE TO RELATED APPLICATIONS

This application claims the priority benefit under 35 U.S.C. §119(e) from U.S. Provisional Application No. 60/911,617, filed Apr. 13, 2007, the disclosure of the entirety of which is incorporated by this reference.

TECHNICAL FIELD

Various embodiments of the present disclosure relate to compositions comprising isolated wheat proteins that are substantially free of sulfites. Other embodiments relate to methods of isolating wheat proteins that are substantially free of sulfites and compositions formed therefrom.

BACKGROUND

Wheat flour is ideal for a variety of processes, such as, bread making, since the storage proteins of wheat form a strong, cohesive dough that retains gas bubbles, such as carbon dioxide produced by yeast during rising of bread products, to produce light baked products. The wheat proteins may be isolated from wheat flour by removing starch and albumins/globulins by gently working the dough under a stream of water. After washing, a rubbery ball remains comprising the wheat gluten proteins, which are known as "vital wheat gluten". Traditionally, plant proteins have been classified into four families according to their solubility: albumins, which are soluble in water or dilute salt solutions and are coagulated by heat; globulins, which are insoluble in pure water but soluble in dilute aqueous salt solutions and insoluble in concentrated aqueous salt solutions; prolamins, which are soluble in aqueous alcohol; and glutelins, which are soluble in dilute acid or bases, detergents, or dissociating or reducing agents, such as urea or 2-mercaptoethanol, respectively.

The prolamins are considered to be unique to the seed of cereals and other grains or grasses. The prolamins have been given different names in different cereals, such as: gliadin in wheat, avenins in oats, zeins in maize, secalins in rye, and hordein in barley. The gliadins and glutenins of wheat are the storage proteins of the wheat endosperm. Gluten can be described as having a composition of gliadin and glutenin. Gluten composition is a major factor in determining wheat dough mixing strength and processing characteristics.

Gliadin, or the gliadin fraction of gluten, has a low ionic strength and excellent film forming properties. Gliadin is insoluble in water; however, its solubility may be modified with the addition of a surfactant and/or adjustment of the pH. Gliadin may absorb up to twice its weight of water. Glutenin, or the glutenin fraction of gluten, is highly elastic and rubbery and is also resistant to shear. Glutenin is insoluble in alcohol and neutral water, however, its solubility may be modified with the addition of a surfactant and/or adjustment of the pH. The protein structure of glutenin is stabilized by interchain disulfide bonds.

Vital wheat gluten is approved by the U.S. Food and Drug Administration as Generally Recognized as Safe (GRAS) under 21 C.F.R. §184.1322 for use as a dough strengthener, formulation aid, nutrient supplement, processing aid, stabilizer and thickener, surface finishing agent, and texturizing agent at levels not to exceed current good manufacturing practice. Vital wheat gluten is defined as a viscoelastic gluten that is extensible when hydrated.

Through further removal of non-protein constituents, the protein content of vital wheat gluten can be increased. The functional properties of this protein can be modified through the use of acids, reducing agents, phosphates, enzymes, and combinations thereof to convert the proteins to a "wheat protein isolate" or a "modified wheat protein isolate" (which in certain markets may be known as "hydrolyzed wheat protein").

Wheat protein isolates may be modified with a reducing agent, such as, for example, sodium metabisulfite, bisodium sulfite, other salts of sulfite, bisulfite and/or metabisulfite, and/or other sulfur containing reducing agents. Reducing agents are added to the wheat protein isolates to cleave the inter- and/or intra-strand cross-links between protein strands, which results in a product having a lower viscosity or a more "liquid" product. However, the presence of sulfites or other sulfur containing reducing agents may result in an allergic response in certain consumers. In addition, in certain markets the presence of added sulfites in a product may preclude the use of certain descriptors, such as "natural" or "organic", from being used to describe a product containing sulfites or a product containing a wheat protein isolate containing sulfites.

Wheat protein isolates have been used in the food industry as an ingredient to alter texture and enhance taste and appearance in food products. Wheat protein isolates may add certain benefits to food products, including, for example, replacing sugar or carbohydrate functionalities in baked or processed foods; building structure or improving crumb texture in baked goods; improving freeze-thaw performance with improved texture and mouthfeel; replacing sugar as a binder in bars and coatings for cereals; increasing protein levels in foods without sacrifice of taste and texture; improving dough rheology, proofing times, and sheeting performance; reducing fat in food products; generation of foam and other types of controlled air entrapment; and improving taste and texture in whole grain applications.

SUMMARY

Various embodiments of the present disclosure relate to isolated wheat proteins that are substantially free of sulfites, compositions made therefrom and methods of making isolated wheat proteins and compositions made therefrom.

One embodiment of the present disclosure provides a composition comprising an isolated wheat protein, wherein the isolated wheat protein is substantially free of sulfites. Food compositions comprising the isolated wheat protein are also disclosed.

Other embodiments of the present disclosure provide a process for producing an isolated wheat protein. The process comprises admixing water, an acid, and wheat gluten to form a gluten slurry; and agitating the gluten slurry at a reaction temperature for a time sufficient to produce an isolated wheat protein, wherein the isolated wheat protein is substantially free of sulfites. In certain embodiments, the process may further comprise drying the isolated wheat protein. Still other embodiments provide an isolated wheat protein made by the processes disclosed herein.

Still other embodiments of the present disclosure provide a process for producing a food composition. The process may comprise incorporating an isolated wheat protein that is substantially free of sulfites into the food composition.

Further embodiments of the present disclosure provide a composition comprising an isolated wheat protein that is free of sulfites. Other embodiments provide a composition consisting essentially of an isolated wheat protein and an acid.

Still other embodiments provide a composition consisting of an isolated wheat protein and an acid.

Still further embodiments of the present disclosure provide a composition consisting essentially of isolated wheat protein and lactic acid. The composition has a protein content of at least 85% as determined by measuring the nitrogen content of the composition and multiplying by 6.25.

Other embodiment provide for a container comprising any of the compositions described herein.

DESCRIPTION OF THE DRAWINGS

The various embodiments of the disclosure may be better understood with reference to the following figures.

DETAILED DESCRIPTION

Figure 1:
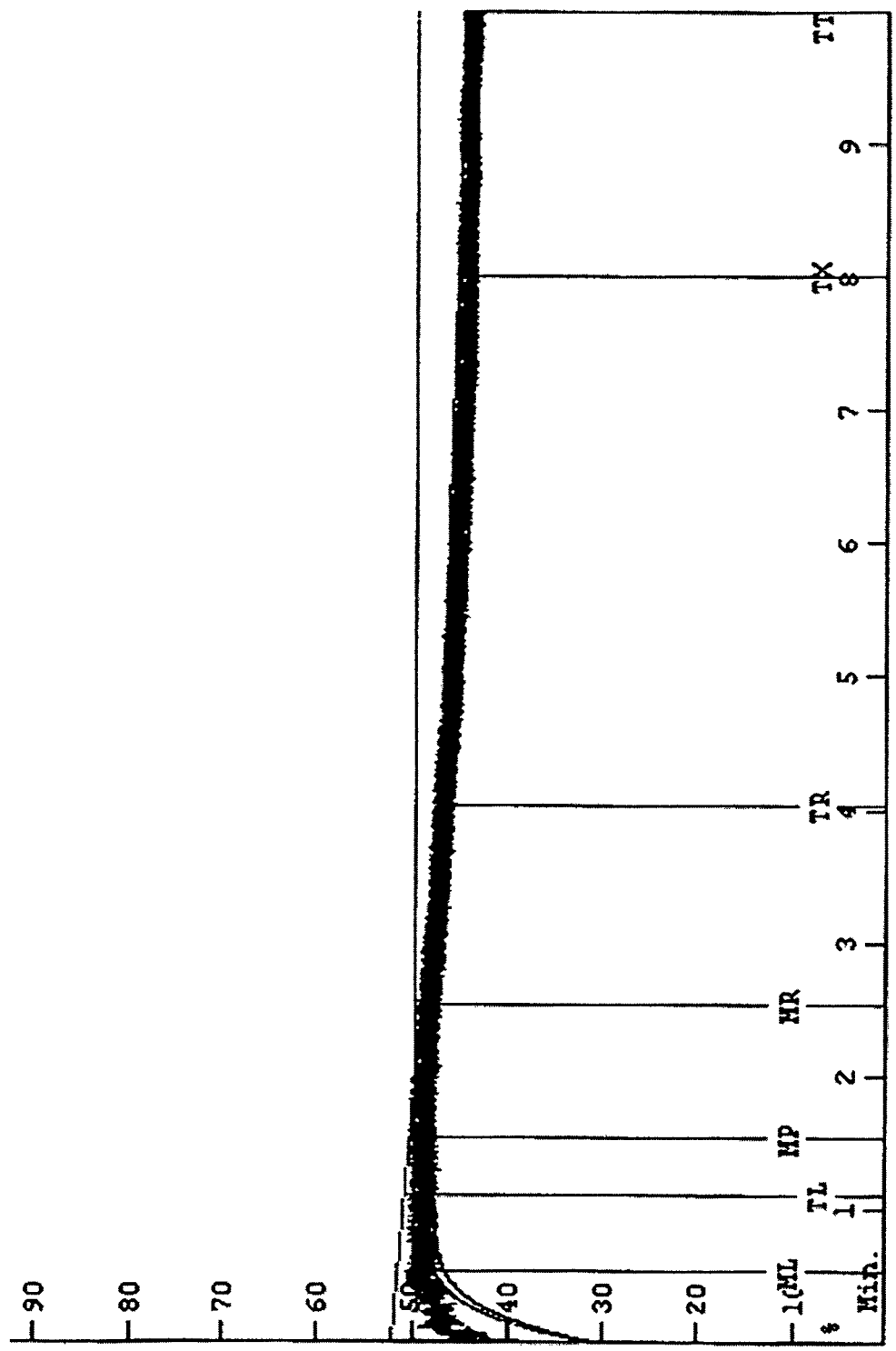
FIG. 1 illustrates a mixograph plot of a sulfite-free isolated wheat protein produced according to one embodiment of the present disclosure.

Various embodiments of the present disclosure relate to isolated wheat proteins that are substantially free of sulfites and compositions, such as, food compositions, made therefrom. Processes for isolating wheat proteins that are substantially free of sulfites are also disclosed.

Other than the operating examples, or where otherwise indicated, all numbers expressing quantities of ingredients, processing conditions and the like used in the specification and claims are to be understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical values, however, may inherently contain certain errors, such as, for example, equipment and/or operator error, necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of less than or equal to 10.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure describes several different features and aspects of the various exemplary embodiments provided herein. It is understood, however, that the present disclosure embraces numerous alternative embodiments, which may be accomplished by combining any of the different features, aspects, and embodiments described herein in any combination that one of ordinary skill in the art would find useful.

According to certain embodiments, the present disclosure provides for a composition comprising an isolated wheat protein, wherein the isolated wheat protein is substantially free of sulfites. In one embodiment, the isolated wheat protein may comprise at least 60% protein by weight, as determined by measuring nitrogen content and multiplying by 5.7. In another embodiment, the protein content may be determined by measuring nitrogen content and multiplying by 6.25. As used herein, the term "substantially free" when used in reference to sulfite concentrations, includes a sulfite concentration that is below the measurable limit using standard analytical procedures, such as, the Monier-Williams Method (AOAC 990.28, the entirety of which is incorporated by reference herein). According to certain embodiments, the isolated wheat protein may have a sulfite concentration of less than 0.001% by weight (i.e., less than 10 ppm). According to other embodiments, the isolated wheat protein may have a sulfite concentration of 0% by weight.

As discussed herein, sulfur reducing agents, such as sulfites, including, but not limited to, sodium metabisulfite, bisodium sulfite, and other salts of sulfite, bisulfite, and/or metabisulfite, are used during the formation of commercially available modified wheat proteins, for example, to reduce the viscosity of the wheat protein and provide for a more "fluid" product during formation. However, certain consumers of food products which incorporate sulfite-treated modified wheat proteins may have a sensitivity or an allergic reaction to the sulfites present in commercially available modified wheat proteins. The isolated wheat proteins of the present disclosure are produced by a process that does not involve sulfite reducing agents and are, therefore, substantially free of sulfites. Thus, the isolated wheat proteins of the present disclosure may be used by consumers without a sensitivity or allergic response, since the isolated wheat proteins are substantially free of sulfite sensitizing agents and/or allergens.

In addition, there has been a growing desire in certain consumers for products and food compositions that are all natural and/or organic (as defined by various regulating agencies). Certain regulatory agencies may limit or regulate how compositions containing sulfites may be described. For example, in certain markets, the presence of sulfites in a product or food composition may preclude the use of certain monikers, descriptors, or indicia for describing the sulfite-containing product or food composition. For example, in certain markets, the presence of sulfites in a product or food composition may prevent the use of descriptors, such as, for example, "organic" or "natural" when describing the product or food composition. Thus, modified wheat proteins that are produced by recognized commercial processes may not be described as "natural" or "organic" due to these restrictions. However, the compositions of the present disclosure comprising isolated wheat proteins that are substantially free of sulfites will not be subject to these regulations.

As discussed herein, according to certain embodiments, the isolated wheat proteins of the present disclosure have acceptable viscosities. Viscosity is a measurement of the fluidity or liquidity of a composition, such as the isolated wheat protein. During the production of conventional modified wheat proteins, the viscosity of the conventional wheat proteins is decreased by the addition of a reducing agent such as a sulfite reducing agent (as described herein). While not intending to be limited by any theory, it is believed that as the sulfite reduces the inter- and intra-strand bonds of the protein, the wheat protein chains move more readily relative to one another, resulting in a more fluid or liquid wheat protein. The present disclosure enables the production of isolated wheat proteins having suitable viscosities without the use of sulfite reducing agents. For example, according to certain embodiments, the isolated wheat proteins of the present disclosure may have a Brookfield viscosity at 20% solids (by weight) and 20 rpm ranging from 50 cps to 1200 cps at room temperature (i.e. approximately 20 to 25° C.). According to other embodiments, the isolated wheat proteins may have a Brookfield viscosity at 20% solids (by weight) and 20 rpm ranging from 100 cps to 500 cps at room temperature. According to still other embodiments, the isolated wheat proteins may have a Brookfield viscosity at 20% solids (by weight) and 20 rpm ranging from 200 cps to 300 cps at room temperature. It should be noted that the present disclosure and the isolated wheat proteins discussed herein are not limited by any particular measuring system, such as the Brookfield system, or specific solids content or rpm of the viscosity measurement, and the present disclosure is intended to cover other measuring devices and/or conditions and the equivalent viscosity ranges measured thereby.

According to certain embodiments, the isolated wheat proteins of the present disclosure may be modified by treatment with an acid and/or a non-sulfite reducing agent. As discussed herein, modification of the wheat protein structure may result in a protein composition wherein the intra- or inter-strand bonds between protein strands and/or amide bonds in the protein backbone may be broken. For example, the secondary, tertiary and/or quaternary structure of the wheat protein may be held together by hydrophobic forces, ionic or partial ionic attractive forces (such as ionic bonds or salt bridges), hydrogen bonds, and/or covalent bonds (such as disulfide bonds). Treating the wheat protein with an acid may break at least some of the intra- and inter-strand attractive forces. Alternatively, or in addition, treating the wheat protein with an acid may result in hydrolysis of one or more of the amide (peptide) bonds in the protein backbone. As a result of treating the wheat protein with an acid, the wheat protein structure may be modified and the protein strands may more easily move relative to each other. The isolated wheat protein treated with an acid, as described herein, may therefore have less viscous, more liquid characteristics, similar to or better than those of sulfite-treated wheat protein isolates.

It has been discovered that isolated wheat proteins having acceptable viscosities and other properties may be produced without the use of sulfite reducing agents. For example, it has been discovered that the protein structure of the wheat proteins may be suitably modified by treating the wheat proteins with an acid, as described herein, with agitation, such as mixing, high-shear mixing, stirring, sonication, and combinations of any thereof. Due to the increased viscosity of the starting wheat protein without the sulfite reducing agent, agitation may necessarily have to be performed for an extended period of time and/or with a higher shear force to obtain isolated wheat proteins with acceptable viscosities and other properties.

In certain embodiments, the wheat protein may be treated with an acid. The acid may be an organic acid, such as, for example, a carboxylic acid or sulfonic acid, or an inorganic acid. In certain embodiments where the wheat protein is treated with an organic acid, the acid may be an organic carboxylic acid, such as, for example, lactic acid, citric acid, ascorbic acid, tartaric acid, malic acid, fumaric acid, propionic acid, succinic acid, acetic acid, oxalic acid, or combinations of any thereof. In other embodiments, the wheat protein may be treated with an inorganic acid, such as, for example, hydrochloric acid, phosphoric acid, hydrogen sulfide, sulfuric acid, nitric acid, or combinations of any thereof. In addition to the organic acids and inorganic acids recited herein, the wheat protein may be treated with a combination of acids, including various combinations of any of the organic and inorganic acids recited herein. In one embodiment, the amount of acid that may be used ranges from 0.25% to 5% on a dry basis in the powder composition.

According to certain embodiments, the acid may be lactic acid (2-hydroxypropionic acid). Lactic acid suitable for use in the various embodiments may be from a variety of sources. For example, lactic acid may be produced by an industrial process, for example, from a petroleum based feedstock. In other embodiments, lactic acid may be produced by a biochemical process or pathway. For example, lactic acid may be produced by a fermentation process in cell, such as a bacteria, fungus, or yeast. For lactic acid from a fermentation process in a cell, the cell may naturally produce lactic acid by a biochemical process or, alternatively, the cell may be genetically modified, for example, by a gene splicing or an insertion process, to produce lactic acid. The genetically modified organism (GMO) may produce lactic acid at a greater rate than a non-genetically modified organism. It should be noted, however, that in certain markets compositions containing products from genetically modified organisms (GMOs) may not be desirable or may be banned altogether. Therefore, in certain embodiments, the isolated wheat proteins of the present disclosure may be modified by treating with lactic acid (or other organic acid) that has been isolated from a non-genetically modified organism. Isolated wheat proteins produced using non-GMO-sourced lactic acid may be utilized in markets sensitive to GMO products or may be labeled, for example, with indicia indicating that it contains no GMO produced materials. In certain embodiments, the lactic acid may be a food grade lactic acid.

In certain embodiments, the acid may be added to an aqueous slurry of the wheat protein in such an amount sufficient to provide a pH ranging from 2.0 to 5.0. The pH of the solution or slurry of wheat protein and acid may vary depending on the amount of solids in the slurry and the mixing or agitation methods, temperature, and/or time.

The isolated wheat proteins of the present disclosure that are substantially free of sulfites may have improved properties and characteristics compared to modified wheat protein isolates that are not substantially free of sulfites (i.e., that are produced using sulfites or sulfite reducing agents). For example, the isolated wheat proteins of various embodiments described herein have improved foaming characteristics and/or a blander flavor as compared to sulfite containing modified wheat protein isolates.

In certain embodiments, the isolated wheat proteins of the present disclosure that are substantially free of sulfites may demonstrate improved (i.e., greater) stiffness and longevity as compared to a modified wheat protein isolate that is not substantially free of sulfites. In other embodiments, the isolated wheat proteins that are substantially free of sulfites may foam faster than modified wheat protein isolates that are not substantially free of sulfites. For example, the isolated wheat proteins of the present disclosure may achieve a full foam in 20% to 50% less time than it takes a modified wheat protein isolate that is not substantially free of sulfites to achieve a full foam. As used herein, the term "full foam" includes wherein the product is foamed to a texture similar to beaten egg whites or whipped cream texture.

In other embodiments, the isolated wheat proteins of the present disclosure may have a more desirable flavor profile, including for example, a blander flavor than modified wheat protein isolates that are not substantially free of sulfites. For example, isolated wheat proteins of the present disclosure may have a flavor profile in which the cereal notes and flavors are low. Isolated wheat protein isolates with low cereal notes and/or blander flavor may be incorporated into compositions, such as food compositions, without significantly affecting the flavor of the resulting food composition, for example, by imparting the flavor of the wheat protein composition to the food composition or by masking desired flavors from other components of the food compositions.

As described herein, the isolated wheat proteins of the present disclosure may be produced from wheat gluten, vital wheat gluten, wheat protein isolates or wheat protein concentrates. Wheat protein isolates may have a protein content of at least 75% by weight, whereas wheat protein concentrates may have a protein content of at least 60% by weight. Thus, according to certain embodiments, the isolated wheat proteins of the present disclosure may have a protein content of at least 60% by weight. According to other embodiments, the isolated wheat proteins of the present disclosure may have a protein content of at least 75% by weight. According to still other embodiments, the isolated wheat proteins of the present disclosure may have a protein content of at least 80% by weight. In certain embodiments, the isolated wheat proteins of the present disclosure may have a maximum protein content of 99% by weight. The protein content of the isolated wheat proteins of the present disclosure may be measured by any method known in the art. For example, one method of measuring the protein content in a food composition is the Kjeldahl method which involves measuring the nitrogen content in the modified wheat protein isolates (for example by a chemical degradation) and then multiplying by 5.7 (corresponding to the nitrogen content of wheat proteins). In other embodiments, the protein content may be calculated by multiplying the nitrogen content by 6.25. Other methods for measuring the nitrogen content in the isolated wheat proteins, such as combustion nitrogen analysis (the "Dumas method"), may also be used.

The present disclosure also provides for food compositions that comprise the isolated wheat proteins that are substantially free of sulfites according to any the various embodiments disclosed herein. Food compositions may include, but are not limited to, baked goods, processed foods, whole grain foods, food bars, cereals, granolas, doughs and batters, cakes, tortillas, snacks, cookies, microwave bakery products, whips, fillings, frostings, frozen foods, wieners, sausages, meat loaf, meat patties, dressings, spreads, pet foods, fish feeds, shrimp feeds, or animal feeds.

According to other embodiments, the present disclosure provides processes for producing an isolated wheat protein that are substantially free of sulfites. According to one embodiment, the process for producing an isolated wheat protein may comprise admixing water, an acid, and wheat gluten to form a gluten slurry, agitating the gluten slurry at a reaction temperature for a time sufficient to produce an isolated wheat protein, wherein the isolated wheat protein is substantially free of sulfites. According to other embodiments, the process for producing an isolated wheat protein may comprise admixing water, an acid, and wheat gluten at a temperature to form a gluten slurry and agitating the gluten slurry at the temperature for a time sufficient to produce an isolated wheat protein wherein the isolated wheat protein is substantially free of sulfites. According to certain embodiments, the isolated wheat protein may have a sulfite concentration of less than 0.001% by weight (less than 10 ppm). According to other embodiments, the isolated wheat protein may have a sulfite concentration of 0% by weight.

In certain embodiments, the reaction temperature may range from 10° C. (50° F.) to 65.6° C. (150° F.). In other embodiments, the temperature may range from 21° C. (70° F.) to 54.5° C. (130° F.). In other embodiments, the temperature may range from 37.8° C. (100° F.) to 48.9° C. (120° F.), or in still other embodiments from 45.6° C. (114° F.) to 47.8° C. (118° F.). In other embodiments, the temperature may range from 21° C. (70° F.) to 93.3° C. (200° F.). In other embodiments, the temperature may range from 37.8° C. (100° F.) to 93.3° C. (200° F.).

The gluten slurry may be formed by admixing water, an acid, such as any of the acids described herein, and wheat gluten, such as a wet wheat gluten, to form the slurry. In certain embodiments, the admixing may be performed at the reaction temperature or a temperature higher than the reaction temperature (such as the water temperature). The wheat gluten and the acid may be added to the water in such an amount to result in a gluten slurry having a total solids content ranging from 8% to 35% on a dry basis. In another embodiment, the gluten slurry may have a total solids content ranging from 15% to 25% on a dry basis. In another embodiment, the gluten slurry may have a total solids content ranging from 18% to 22% on a dry basis. In another embodiment, the gluten slurry may have a total solids content ranging from 19% to 20% on a dry basis.

According to certain embodiments, the total solids content of the gluten slurry may be an important feature of the processes of the present disclosure. For example, formation of the isolated wheat proteins that are substantially free of sulfites requires that the gluten slurry be agitated for an extended period and/or with a high shear force. Without intending to be limited by any particular interpretation, it is believed that by eliminating the sulfite in the production process, the gluten slurry will have a higher viscosity during the production process as compared to a gluten slurry with added sulfite. It is believed that the chemical action of the sulfite (i.e., cleavage of inter- and intra-strand protein linkages) may be replaced by increased or extended agitation or stirring with appropriate adjustment of pH and temperature. That is, the increased stirring or agitation of the gluten slurry may result in cleavage of inter- and intra-strand protein linkages resulting in an isolated wheat protein product having a desired final viscosity. In certain embodiments where the viscosity of the gluten slurry is increased due to the absence of sulfites, stirring or agitation may be more readily performed by reducing the total solids content of the slurry, for example, by decreasing the amount of gluten added to the slurry and/or increasing the amount of water added to the slurry. In other embodiments, the viscosity of the gluten slurry may be adjusted by adjusting the pH of the slurry to from 2.0 to 5.0, or in other embodiments adjusting the pH of the slurry to from 3.0 and 4.5. In still other embodiments, the pH may be from 3.5 to 4.0.

According to the various processes, the temperature of the gluten slurry may be adjusted to a second temperature ranging from 10° C. (50° F.) to 65.6° C. (150° F.). In other embodiments, the second temperature may range from 21° C. (70° F.) to 54.5° C. (130° F.). In other embodiments, the second temperature may range from 37.8° C. (100° F.) to 48.9° C. (120° F.), or in still other embodiments from 45.6° C. (114° F.) to 47.8° C. (118° F.). In certain embodiments, excessive reaction temperature (i.e., a reaction temperature or a second temperature that is too high) may result in gelatinization of the residual starch in the wheat gluten under the reaction conditions. This may result in problems during drying of the resulting isolated wheat protein. Therefore, excessive reaction temperatures should be avoided when gelatinization is not desired.

The gluten slurry may be agitated at the reaction temperature or second temperature for a time sufficient to produce an isolated wheat protein having a desired viscosity. For example, according to certain embodiments, the isolated wheat protein may have a Brookfield viscosity (as defined herein) ranging from 50 cps to 1200 cps at room temperature (i.e., 20° C. to 25° C.). As used herein, "agitation" and "agitating" include stirring the gluten slurry, mixing the gluten slurry, mixing the gluten slurry with a high shear (e.g., using a high shear mixer), agitating the gluten slurry, and sonicating the gluten slurry or any combinations of these agitation methods. In certain embodiments, agitating the gluten slurry is performed using a high shear, such as, for example, mixing at a high speed. In other embodiments, agitating the gluten slurry is performed using a standard mixing speed. As the gluten slurry is agitated over the reaction time, the viscosity of the slurry will decrease. In various embodiments, as the gluten slurry viscosity decreases, the mixing speed may also be decreased. For example, in one embodiment, after the viscosity of the gluten slurry has decreased to approximately 250 cps, the speed of the agitator may be lowered, for example from a high speed to a medium or low speed.

In other embodiments, the gluten slurry may be agitated for a time sufficient to produce an isolated wheat protein having a Brookfield viscosity ranging from 100 cps to 500 cps at room temperature. In other embodiments, the gluten slurry may be agitated for a time sufficient to produce an isolated wheat protein having a Brookfield viscosity ranging from 200 cps to 300 cps at room temperature. In certain embodiments, the gluten slurry may be agitated, for example, at a high speed, for a time period ranging from 1 minute to 240 minutes. In other embodiments, wherein a lower or more vigorous agitation is used, it will be understood that the agitation time will be adjusted accordingly. For example, in certain embodiments, where a lower energy agitation is used, the agitation time may be increased, whereas in embodiments where a higher energy agitation is used, the agitation time may be shortened.

As set forth herein, the wheat proteins are mixed with an acid, as described herein. In certain embodiments, the acid may be added in an amount ranging from 0.1% to 5.0% by weight. For example, in certain embodiments, the acid may be lactic acid (which may be from a variety of sources, as described herein) which may be admixed with the water and the wheat gluten in an amount ranging from 0.1% to 5.0% by weight of the slurry. In other embodiments, the acid, such as lactic acid, may be added in an amount ranging from 0.1% to 1.0% by weight of the slurry.

After agitating the gluten slurry to form the isolated wheat protein, the isolated wheat protein product may be separated from any residual bran remaining in the reactor. For example, the isolated wheat protein product may be separated from the residual bran, or may be removed from the residual bran by other means known in the art. In other embodiments, bran may be removed from the wheat gluten prior to reacting the wheat gluten with the acid.

In certain embodiments, the isolated wheat protein product from the agitation, such as the aqueous slurry of the isolated wheat protein, may be held in a holding tank prior to drying. In certain embodiments, the holding tank may be equipped with a variable speed agitator, such as an agitator with a speed variable between 30 rpm and 500 rpm. Agitation of the slurry may aid in maintaining the isolated wheat protein in a soluble "fluid" or "liquid" form, such as a fluid or liquid having a viscosity ranging from 40 cps to 300 cps. In certain embodiments, agitation of the isolated wheat protein product in the holding tank may prevent the slurry from thickening, for example to a higher viscosity, while in the holding tank or may prevent formation of a film on the surface of the slurry. Maintaining the viscosity of the slurry at acceptable levels may also assist in transporting the slurry from one site to another, for example, when pumping the slurry from the holding tank to the dryer, such as via a transfer pipe or other transfer mechanism used in the art.

Certain embodiments of the processes of the present disclosure may further comprise drying the isolated wheat protein, for example, to remove water from the product. For example, the slurry comprising the isolated wheat protein that is substantially free of sulfites, may be dried at an air temperature ranging from 160° C. (320° F.) to 260° C. (500° F.). The isolated wheat protein may be dried for a time sufficient to provide an isolated wheat protein product having a product temperature ranging from 71.1° C. (160° F.) to 110° C. (230° F.). In certain embodiments, the isolated wheat protein may be dried to a moisture content ranging from 0.1% to 10.0% moisture by weight. In other embodiments, the isolated wheat protein may be dried to a moisture content ranging from 0.1% to 7.0%; in still other embodiments, a moisture content ranging from 4.0% to 6.0%; and in still other embodiments, a moisture content of 5.0%. In still other embodiments, the moisture content may be less than 7% by weight. In various embodiments, the internal temperature of the dryer may be increased, wherein the higher temperature may damage the gluten structure, thereby reducing its functionality (as shown by a lower line in a mixograph). The dried isolated wheat protein product may be cooled to room temperature. The isolated wheat protein may be dried by any means recognized in the art. For example, in one embodiment the isolated wheat protein may be dried in a drying oven at a temperature from 160° C. (320° F.) to 260° C. (500° F.). The drying oven may be at ambient pressure or, in certain embodiments, the drying oven may be at reduced pressure. In other embodiments, the isolated wheat protein may be dried by freeze drying, spray drying, ring drying or flash drying. Various combinations of any of these drying methods are also contemplated.

In various embodiments, the dried isolated wheat protein that is substantially free of sulfites may have a powder, granular, or particulate formulation. For example, according to one embodiment, the dried isolated wheat protein may be granular in form, having a size such that at least 85% of the isolated wheat protein grains are able to pass through a #60 mesh USBS sieve. That is, a #60 mesh sieve has sieve openings of 250 μm and therefore, at least 85% of the isolated wheat protein grains will have a size less than 250 μm. In other embodiments, the dried isolated wheat protein may have a granular form having a size such that at least 95% of the isolated wheat protein grains are able to pass through a #60 mesh USBS sieve.

In other embodiments of the process for producing the isolated wheat protein that is substantially free of sulfites, the isolated wheat protein may have improved foaming characteristics as compared to a modified wheat protein isolate that is not substantially free of sulfites. Improved foaming characteristics may include, for example, improved (i.e., greater) stiffness of foams, improved longevity or stability of the foam, and/or faster foaming time as compared to a modified wheat protein isolate that is not substantially free of sulfites. For example, certain embodiments of the isolated wheat protein of the present disclosure may achieve a full foam in 20% to 50% less time than it takes a modified wheat protein isolate that is not substantially free of sulfites to achieve a full foam. In other embodiments, the isolated wheat protein produced by the processes of the present disclosure may have a more desirable flavor profile, such as, a blander flavor, than modified wheat protein isolates that are not substantially free of sulfites.

In other embodiments, the processes of the present disclosure may further comprise placing the isolated wheat protein into a container, such as a container that is configured for shipping. In still other embodiments, the processes may further comprise associating indicia with the container, wherein the indicia are capable of informing a user or consumer of the content of the container. Still other embodiments may further comprise shipping the container, for example by means of an airplane, ship, truck, railcar, or combinations of any of these shipping methods. The container may be shipped, for example, from a first geographic location to a second geographic location.

Other embodiments of the present disclosure are directed to an isolated wheat protein that is substantially free of sulfites made by any of the processes disclosed herein. For example, one embodiment relates to an isolated wheat protein made by the process comprising admixing water, an acid, and wheat gluten to form a gluten slurry, adjusting the temperature to a reaction temperature, and agitating the gluten slurry at the reaction temperature for a time sufficient to produce an isolated wheat protein wherein the isolated wheat protein is substantially free of sulfites.

Further embodiments of the present disclosure provide a process for producing a food composition. The process may comprise incorporating an isolated wheat protein that is substantially free of sulfites into the food composition. The isolated wheat protein that is substantially free of sulfites may be any of the isolated wheat protein as set forth herein or may be made by any of the processes for producing an isolated wheat protein as set forth herein. Food compositions may include, but are not limited to, baked goods, processed foods, whole grain foods, food bars, cereals, granolas, doughs and batters, cakes, tortillas, snacks, cookies, microwave bakery products, frozen foods, wieners, sausages, meat loaf, meat patties, whips, fillings, frostings, dressings, spreads, pet foods, fish feeds, shrimp feeds, or animal feeds. The isolated wheat protein composition that is substantially free of sulfites may be used as an at least partial replacement for conventional wheat protein isolates that are not substantially free of sulfites, for example, in compositions or methods set forth in co-pending U.S. Non-provisional application Ser. No. 11/473,662 filed Jun. 23, 2006, published as U.S. Patent Publication 2007/0014914; Ser. No. 11/540,080 filed Sep. 29, 2006, published as U.S. Patent Publication 2007/0077345; and U.S. Non-provisional application Ser. No. 12/011,067, filed Jan. 24, 2008, the disclosures of each of which are incorporated in their entirety by reference herein.

Other embodiments of the present disclosure provide a composition comprising an isolated wheat protein that may be free of sulfites. Still other embodiments include a composition consisting essentially of an isolated wheat protein and an acid. Still other embodiments include a composition consisting of an isolated wheat protein and an acid. According to various embodiments, the composition may include an acid, such as, an organic acid, as provided herein, including, but not limited to, in one specific embodiment, lactic acid.

In other embodiments, the isolated wheat protein product may have a pH from 4.0 to 11.0. In certain embodiments, the pH of the isolated wheat protein product may range from 6.0 to 9.0 and, in other embodiments, the pH may range from 6.0 to 8.0. The pH of the isolated wheat protein may be adjusted to the desired pH level by the addition of one or more basic or alkali ingredient or reagent, such as, for example, phosphate salts, soda ash, sodium bicarbonate, and other alkali reagents. Other embodiments of the compositions may further comprise a phosphate, such as a phosphate salt or phosphoric acid. One example of a phosphate salt that may be used includes, but is not limited to, sodium phosphate. In one embodiment, the amount of phosphate that may be used ranges from 0.25% to 5% on a dry basis in the powder composition. Adjusting the pH of the isolated wheat protein product may result in an isolated wheat protein having one or more of good film forming properties, good elastic properties, higher viscosity, or other properties.

According to various embodiments, the composition may have a protein content of at least 60% by weight. In other embodiments, the composition may have a protein content of at least 75% by weight. In other embodiments, the composition may have a protein content of at least 80% by weight. As described herein, protein content may be measured by any suitable means, including, but not limited to, by measuring the total nitrogen content of the composition and then multiplying by 5.7, or in certain embodiments by multiplying the total nitrogen content by 6.25.

Still other embodiments of the compositions may have a granular, particulate or powder form. For example, according to one embodiment, the composition may have a granulation such that at least 85% of the composition is able to pass through a #60 mesh USBS sieve. In another embodiment, at least 95% of the composition may be able to pass through a #60 mesh USBS sieve.

Other embodiments of the present disclosure may include a foodstuff comprising any of the compositions described herein. Still other embodiments of the present disclosure may provide a container comprising any of the compositions described herein. As used herein, the term "container" includes any device capable of holding the composition, which may be sealed or open, and may be suitable for shipping.

Still other embodiments of the present disclosure may include a composition consisting essentially of isolated wheat protein and lactic acid, wherein the composition has a protein content of at least 85% as determined by measuring the nitrogen content of the composition, such as using a method described herein, and multiplying by 6.25. Still other embodiments of the composition may have a protein content of at least 90% as determined by measuring the nitrogen content of the composition and multiplying by 6.25. Specific embodiments of the compositions may further comprise phosphate. The composition according to various embodiments may have a sulfite concentration of less than 0.001% by weight. In other embodiments, the composition does not have any measurable sulfite content. The composition may have a moisture content as described herein, which in certain embodiments may be less than 7% by weight.

The composition according to certain embodiments may have a granulation such that at least 85%, of the composition is able to pass through a #60 mesh USBS sieve. In other embodiments, at least 95% of the composition is able to pass through a #60 mesh USBS sieve. The composition may have desirable properties as compared to a modified wheat protein isolate that includes sulfites, for example, the composition may achieve a full foam in 20% to 50% less time, as compared to a sulfite containing modified wheat protein isolate.

In certain embodiments, a slurry of the composition may be made, for example, by suspending the composition in an aqueous solvent, such as water, such that the slurry may have a Brookfield viscosity at 20% solids and 20 rpm ranging from 50 cps to 1200 cps at room temperature.

Still other embodiments of the present disclosure may provide a container comprising the composition according to the various embodiments described herein, wherein the container may be associated with indicia. In certain embodiments, the indicia may be capable of indicating that the composition within the container is substantially free of sulfites, free of measurable sulfites, or has a sulfite content of less than 0.001% by weight.

Various embodiments of the present disclosure will be better understood when read in conjunction with the following non-limiting Examples. The procedures set forth in the Examples below are not intended to be limiting herein, as those skilled in the art will appreciate that various modifications to the procedures set forth in the Examples, as well as to other procedures not described in the Examples, may be useful in practicing the invention as described herein and set forth in the appended claims.

EXAMPLES

Example 1

In this Example, an isolated wheat protein was prepared in which no sulfites were used during the production process. The product isolated wheat protein had no measurable sulfite content.

Water (1370 g) at a temperature of 47.8° C. (118° F.), food grade lactic acid (88%) (13.5 g) and wet wheat gluten having a total solids content of 31.5% on a dry basis ("d.b.") (1200 g, 80% protein as determined by measuring nitrogen content and multiplying by 5.7, commercially available from Archer-Daniels-Midland Company, Candiac, Quebec, Canada) were added to a mixer to form a gluten slurry. The gluten was added over the course of 15 minutes with agitation by mixing and the temperature of the reaction mixture was 45° C. (113° F.) (total solids 15.5% d.b.). The temperature of the slurry was increased to 47.2° C. (117° F.) and the resulting thick slurry (Brookfield viscosity=1000 cps, total solids 17.1% d.b.) was agitated for 70 minutes at a temperature between 47.2° C. (117° F.) and 52.2° C. (126° F.) during which time the viscosity decreased to 240 cps (200 cps at room temperature) and the total solids increased to between 17.5% to 17.8% on a dry basis. The slurry was reacted with agitation at a reaction temperature of 47.8° C. (118° F.) for an additional 80 minutes. The resulting slurry had a Brookfield viscosity of 200 cps. The slurry was dried in a drying oven at a temperature of 72° C. (162° F.) over 2 days to give a sulfite-free isolated wheat protein. A sample of the isolated wheat protein was analyzed in a Mixograph and the resulting mixograph is presented in FIG. 1.

Figure 2:
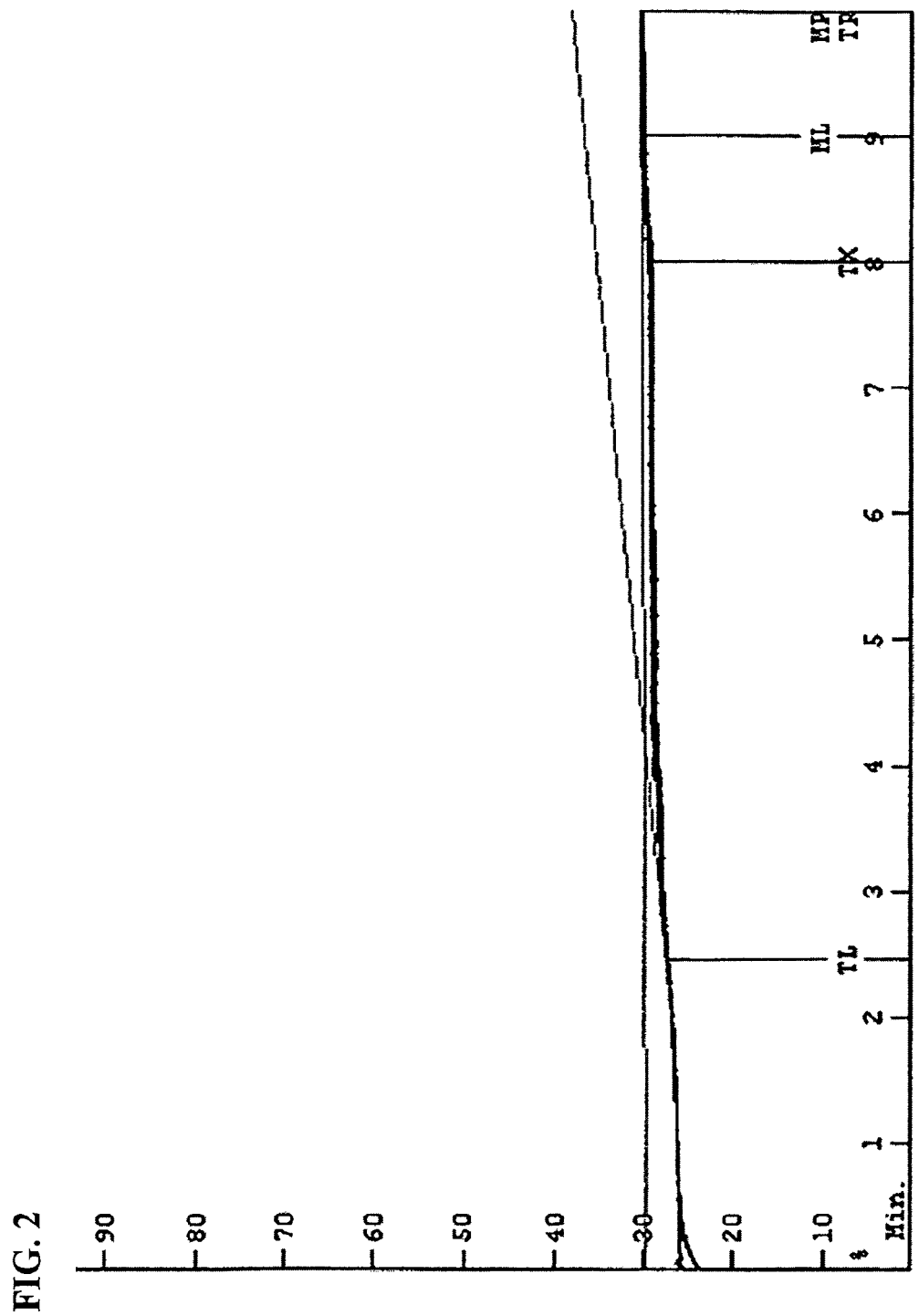
FIGS. 2 and 3 illustrate mixograph plots of sulfite containing modified wheat protein isolates.
Figure 3:
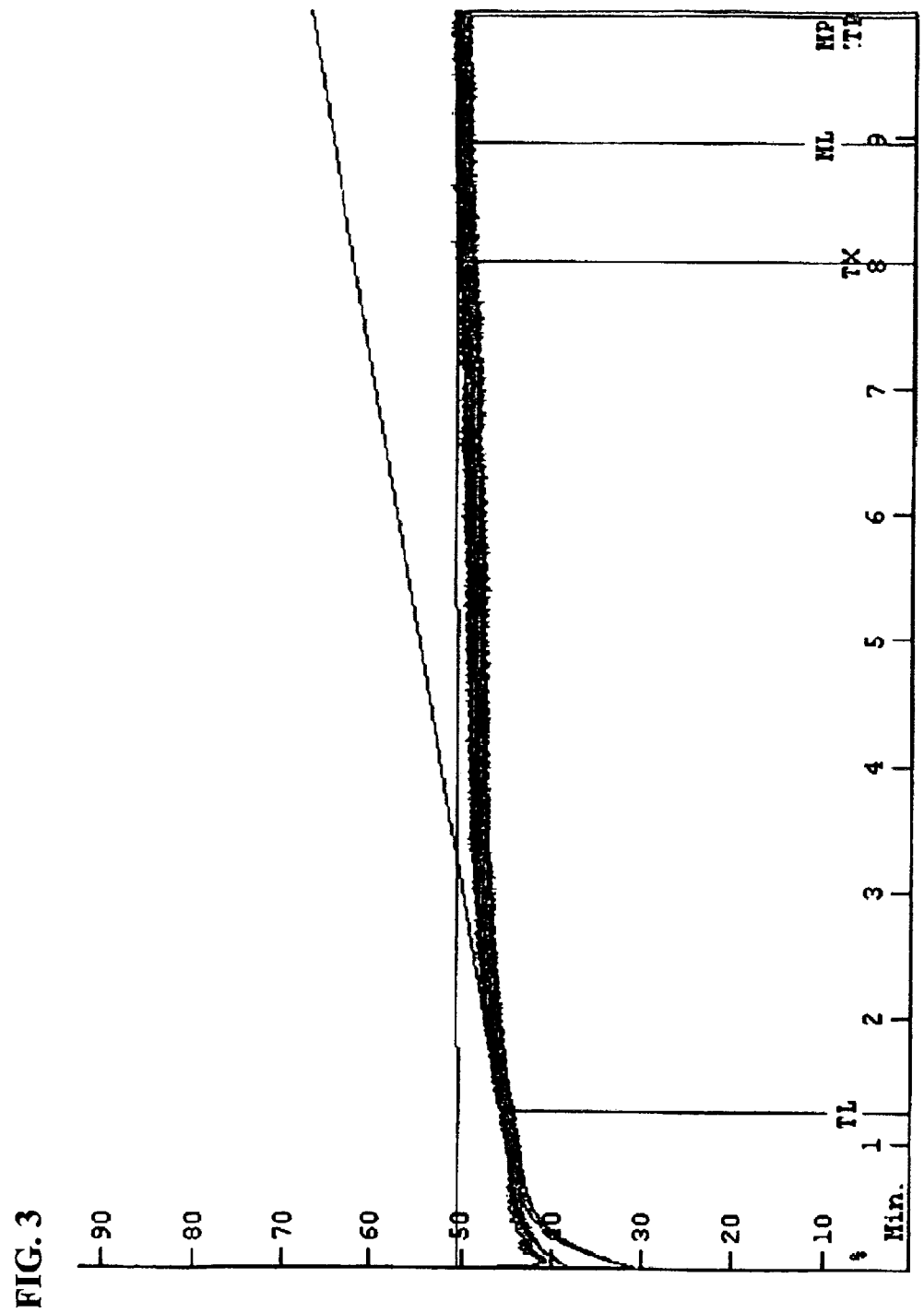
Figure 4:
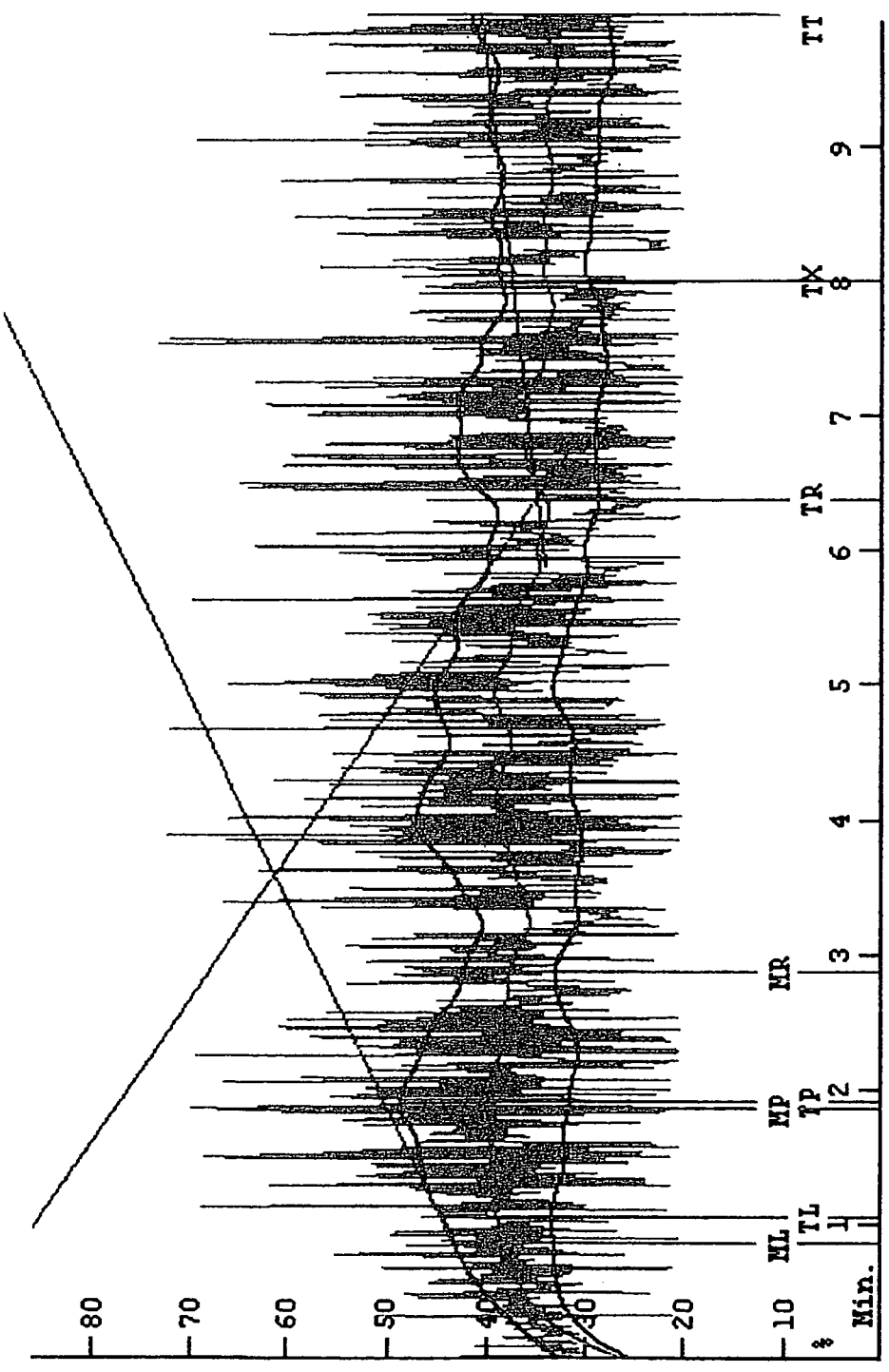
FIG. 4 illustrates a mixograph plot of an unmodified wheat protein.

The sulfite-free isolated wheat protein was compared to the commercially available sulfite containing wheat protein isolates PROLITE® 100 (commercially available from Archer-Daniels-Midland Company, Decatur, Ill.), PROLITE® 200 (commercially available from Archer-Daniels-Midland Company, Decatur, Ill.), Whet Pro™ 75 (vital wheat gluten, commercially available from Archer-Daniels-Midland Company, Candiac, Quebec, Canada), and an enzyme hydrolyzed wheat protein. The comparison results are presented in Table 1. Comparison mixograph plots of PROLITE® 100 and PROLITE® 200 are presented in FIGS. 2 and 3, respectively. The resulting sulfite-free isolated wheat protein showed comparable to improved characteristics, such as foaming characteristics as compared to commercially available sulfite-containing wheat protein isolates. The sulfite-free isolated wheat protein showed improved properties and a mixograph plot compared to unmodified wheat protein (FIG. 4).

TABLE 1

Comparison of Sulfite-Free Isolated Wheat Protein with Sulfite Containing Wheat Protein Isolates

| Test | Prolite ® 100 | | | Sample | | | Prolite ® 200 | | | Whet Pro 75 | | | Enzyme Hydrolyzed Wheat Protein | | |
|---|---|---|---|---|---|---|---|---|---|---|---|---|---|---|---|
| Farinograph | | | | | | | | | | | | | | | |
| Absorption | 65.60 | | | 64.80 | | | 64.90 | | | 64.40 | | | — | | |
| Peak | 5.50 | | | 6.50 | | | 5.50 | | | 8.00 | | | — | | |
| Stability | 5.00 | | | 9.00 | | | 5.50 | | | 18.00 | | | — | | |
| Mixing Tolerance Index (MTI) | 45.00 | | | 35.00 | | | 40.00 | | | 20.00 | | | — | | |

| Mixograph | Time (min) | Value (%) | Width (%) | Time (min) | Value (%) | Width (%) | Time (min) | Value (%) | Width (%) | Time (min) | Value (%) | Width (%) | Time (min) | Value (%) | Width (%) |
|---|---|---|---|---|---|---|---|---|---|---|---|---|---|---|---|
| Left of Peak | 2.46 | 27.58 | 0.21 | 1.10 | 49.80 | 2.06 | 1.24 | 45.71 | 1.32 | 1.06 | 44.59 | 11.22 | 0 | 0 | 1 |
| Peak | 10.00 | 30.58 | 0.30 | 1.10 | 49.80 | 2.06 | 9.94 | 51.34 | 1.50 | 1.90 | 48.71 | 16.94 | 10 | 0 | 1 |
| Right of Peak | 10.00 | 30.58 | 2.99 | 4.03 | 47.70 | 1.65 | 10.00 | 51.34 | 1.50 | 6.39 | 40.40 | 10.92 | 10 | 0 | 1 |

| Alveograph | | | | | | | | | | | | | | | |
|---|---|---|---|---|---|---|---|---|---|---|---|---|---|---|---|
| P | 71 | | | 83 | | | 76 | | | 107 | | | — | | |
| L | 144 | | | 140 | | | 146 | | | 113 | | | — | | |
| G | 26.7 | | | 26.3 | | | 26.9 | | | 23.7 | | | — | | |
| W | 295 | | | 384 | | | 307 | | | 475 | | | — | | |
| P/L | 0.49 | | | 0.59 | | | 0.52 | | | 0.95 | | | — | | |
| Mean Particle Size | 52.94 μm | | | 52.20 μm | | | 62.05 μm | | | 79.57 μm | | | — | | |
| Specific Gravity | 0.1781 | | | 0.1708 | | | NA | | | NA | | | — | | |
| Foam | Stiff Egg whites | | | Between stiff egg whites and marshmallow creme | | | NA | | | NA | | | Weak foam, fast breakdown | | |
| pH | 3.9 | | | 3.9 | | | 6.4 | | | 5.8 | | | 7.6 | | |
| Protein (as is) | 86.8 | | | 83 | | | — | | | — | | | — | | |
| Protein (MFB) | 90.8 | | | 86.3 | | | 85 | | | 75 | | | 76 | | |
| Moisture | 4.5 | | | 3.8 | | | 7 | | | 7.5 | | | 2.9 | | |
| Ash | 0.6 | | | 0.62 | | | 5 | | | 1 | | | 1 | | |

TABLE 1-continued

Comparison of Sulfite-Free Isolated Wheat Protein with Sulfite Containing Wheat Protein Isolates

| Test | Prolite ® 100 | Sample | Prolite ® 200 | Whet Pro 75 | Enzyme Hydrolyzed Wheat Protein |
|---|---|---|---|---|---|
| Loose Density | 15 | 12.8 | 15 | 34 | 21 |
| Packed Density | 26 | 22.8 | 26 | 46 | 31 |

Example 2

In this Example, sulfite-free isolated wheat protein was made from wheat gluten using the procedure of Example 1 with the following modifications.

Wet wheat gluten (2767 kg (6,000 lbs) at 32% solids) was added to sufficient water at 58.3° C. (137° F.) to maintain a total solids content of approximately 19% on a dry basis. The speed of the tank agitator was set at high speed at the beginning of the process and lowered near the end of the reaction as the viscosity decreased (once viscosity reaches approximately 250 cps). The reaction temperature was reduced from approximately 58.3° C. (137° F.) to 46.1° C. (115° F.) by the addition of the wet wheat gluten and over the reaction time. Lactic acid (88%, 27.7 kg (61 lbs)) was added to the slurry. Upon completion of the reaction, the residual bran, starch and fiber were removed from the sulfite-free wheat protein slurry. The sulfite-free wheat protein slurry was transferred to a holding tank with a variable speed agitator with an agitation speed ranging from 10 rpm to 30 rpm. The wheat protein slurry was dried in a drying oven to produce a sulfite-free isolated wheat protein.

Example 3

A substantially sulfite-free wheat protein isolate was produced as described herein. The wheat protein isolate has the following characteristics: at least 90% protein as determined by measuring nitrogen content and multiplying by 6.25 on a dry basis; a maximum of 6.0% moisture; a maximum of 1% ash; about 5% fat, or at most 2% fat as ether extracted; a light cream appearance; and a granulation wherein at least 98% passes through a #60 USBS sieve and at least 99.9% passes through a #30 USBS sieve. The wheat protein isolate also includes lactic acid.

Example 4

A substantially sulfite-free wheat protein isolate was produced as described herein. The wheat protein isolate has the following characteristics: at least 85% protein as determined by measuring nitrogen content and multiplying by 6.25 on a dry basis; a maximum of 7.0% moisture; a maximum of 5% ash; about 5% fat, or at most 2% fat as ether extracted; a light cream appearance; and a granulation wherein at least 98% passes through a #60 USBS sieve and at least 99.9% passes through a #30 USBS sieve. The wheat protein isolate also includes lactic acid and phosphate.

Example 5

In this Example, the foaming characteristics of a composition comprising the substantially sulfite-free wheat protein isolate produced in Example 1 is examined. The following process is used. The substantially sulfite-free wheat protein isolate (100 g) is placed in a mixing bowl of a mixer fitter with a whip. The mixer is started on the lowest speed and tap water (200 mL) at room temperature is added. An addition 200 mL of water is added and the mixer speed increased. The substantially sulfite free wheat protein isolate achieves a full foam having a texture between stiff egg whites and marshmallow crème in 20% to 50% less time than a composition comprising a wheat protein isolate that is not substantially free of sulfites.

Although the foregoing description has presented a number of embodiments of the invention, those of ordinary skill in the relevant art will appreciate that various changes in the components, details, materials, and process parameters of the examples that have been herein described and illustrated in order to explain the nature of the invention may be made by those skilled in the art, and all such modifications remain within the principle and scope of the invention as expressed herein in the appended claims. It will also be appreciated by those skilled in the art that changes could be made to the embodiments described above without departing from the broad inventive concept thereof. It is understood, therefore, that this invention is not limited to the particular embodiments disclosed, but it is intended to cover modifications that are within the principle and scope of the invention, as defined by the claims.

We claim:

1. A composition comprising:
   wheat protein isolate; and
   an organic acid;
   the composition being substantially free of sulfites having less than 10% moisture by weight, and having a Brookfield viscosity at 20% solids and 20 rpm ranging from 50 cps to 1200 cps at room temperature and a pH of about 4.

2. The composition of claim 1, wherein the composition has a sulfite concentration of less than 0.001% by weight.

3. The composition of claim 1, wherein the organic acid is selected from the group consisting of lactic acid, citric acid, ascorbic acid, tartaric acid, malic acid, fumaric acid, propionic acid, succinic acid, acetic acid, oxalic acid, and combinations of any thereof.

4. The composition of claim 1, wherein the composition has a protein content of at least 85% by weight, as determined by multiplying a nitrogen content of the composition by 6.25.

5. The composition of claim 1, further comprising a phosphate.

6. The composition of claim 1, wherein the isolated wheat protein is not enzyme hydrolyzed.

7. The composition of claim 1, wherein the composition has a granulation such that at least 85% of the composition is able to pass through a #60 USBS sieve.

8. A food composition comprising the composition of claim 1.

9. The composition of claim 1, wherein the organic acid is lactic acid.

10. The composition of claim 1, wherein the Brookfield viscosity ranges from 100 cps to 500 cps.

11. A powdered composition having at least 85% protein as determined by measuring nitrogen content and multiplying by 6.25 on a dry basis, the powdered composition comprising:

an isolated wheat protein; and an organic acid, the composition being substantially free of sulfites and having a substantially flat mixograph curve.

12. The composition of claim 11, wherein the organic acid is selected from the group consisting of lactic acid, citric acid, ascorbic acid, tartaric acid, malic acid, fumaric acid, propionic acid, succinic acid, acetic acid, oxalic acid, and combinations of any thereof.

13. The composition of claim 11, wherein the composition has a granulation such that at least 85% of the composition is able to pass through a #60 USBS sieve.

14. The composition of claim 11, the composition having a protein content of at least 90% as determined by measuring the nitrogen content of the composition and multiplying by 6.25.

15. The composition of claim 11, wherein a slurry of the composition has a Brookfield viscosity at 20% solids and 20 rpm ranging from 50 cps to 1200 cps at room temperature and pH of about 4.

16. The composition of claim 11, wherein the composition has a moisture content of less than 10% by weight.

17. The composition of claim 15, wherein the Brookfield viscosity ranges from 100 cps to 500 cps.

18. A powdered composition comprising:

an isolated wheat protein; and an organic acid;

the composition being substantially free of sulfites, and wherein upon dispersion in water, the composition achieves a full foam in 20% to 50% less time than a composition comprising a wheat protein isolate that is not substantially free of sulfites;

wherein a slurry of the powdered composition has a Brookfield viscosity at 20% solids and 20 rpm ranging from 50 cps to 1200 cps at room temperature and a pH of about 4.

19. The composition of claim 18, wherein the Brookfield viscosity ranges from 100 cps to 500 cps.

* * * * *